US009981185B2

United States Patent
Kuwahara et al.

(10) Patent No.: US 9,981,185 B2
(45) Date of Patent: *May 29, 2018

(54) SERVER ENABLED USER DATA EXCHANGE BETWEEN INFORMATION PROCESSING DEVICES

(71) Applicants: Masato Kuwahara, Kyoto (JP); Yutaka Murakami, Kyoto (JP)

(72) Inventors: Masato Kuwahara, Kyoto (JP); Yutaka Murakami, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 363 days.

This patent is subject to a terminal disclaimer.

(21) Appl. No.: 14/744,041

(22) Filed: Jun. 19, 2015

(65) Prior Publication Data

US 2015/0283461 A1  Oct. 8, 2015

Related U.S. Application Data

(63) Continuation of application No. 14/284,676, filed on May 22, 2014, now Pat. No. 9,094,465, which is a
(Continued)

(30) Foreign Application Priority Data

Dec. 9, 2011 (JP) .................................. 2011-269919

(51) Int. Cl.
 *A63F 13/35* (2014.01)
 *A63F 13/79* (2014.01)
 (Continued)

(52) U.S. Cl.
 CPC .............. *A63F 13/35* (2014.09); *A63F 13/79* (2014.09); *H04L 67/2871* (2013.01);
 (Continued)

(58) Field of Classification Search
 CPC ...... A63F 13/35; A63F 13/79; H04L 67/2871; H04W 76/021; H04W 4/028; H04W 4/023; H04W 4/008
 See application file for complete search history.

(56) References Cited

U.S. PATENT DOCUMENTS 7,970,912 B2 * 6/2011 Bourne ................... H04L 51/32
455/414.1
8,126,476 B2   2/2012 Vardi et al.
(Continued)

FOREIGN PATENT DOCUMENTS

JP   2001-309440   11/2001
JP   2004-298373   10/2004
(Continued)

OTHER PUBLICATIONS

Office Action issued in U.S. Appl. No. 13/454,135 dated Sep. 27, 2013 (21 pages).
(Continued)

*Primary Examiner* — Brandon J Miller
(74) *Attorney, Agent, or Firm* — Nixon & Vanderhye PC

(57) ABSTRACT

A server device includes: a receiving unit configured to receive, from each of a plurality of information-processing devices, location information showing a respective location of each information-processing device; a setting unit configured to set a condition showing that one information-processing device is close to another information-processing device, based on a predetermined parameter; a determining unit configured to determine whether a first information-processing device and a second information-processing device from among the plurality of information-processing devices satisfy the condition based on the location information received by the receiving unit; and a transmitting unit configured to transmit information determined at the determining unit to the first information-processing device and
(Continued)

the second information-processing device, in a case that the determining unit determines that the first information-processing device and the second information-processing device satisfy the condition.

16 Claims, 9 Drawing Sheets

Related U.S. Application Data continuation of application No. 13/454,135, filed on Apr. 24, 2012, now Pat. No. 8,849,311.

(51) Int. Cl.
    *H04L 29/08*     (2006.01)
    *H04W 76/02*     (2009.01)
    *H04W 4/02*     (2018.01)
    *H04W 4/00*     (2018.01)

(52) U.S. Cl.
    CPC ......... *H04W 4/028* (2013.01); *H04W 76/021* (2013.01); *H04W 4/008* (2013.01); *H04W 4/023* (2013.01)

(56) References Cited

U.S. PATENT DOCUMENTS

| | | | |
|---|---|---|---|
| 8,279,882 B2 | 10/2012 | Matsunada | |
| 8,285,206 B2 | 10/2012 | Martin et al. | |
| 8,340,688 B2 | 12/2012 | Brown | |
| 8,355,738 B1* | 1/2013 | Lee | H04W 4/02 455/414.1 |
| 8,849,311 B2 | 9/2014 | Kuwahara et al. | |
| 9,094,465 B2* | 7/2015 | Kuwahara | H04W 4/028 |
| 2005/0181803 A1 | 8/2005 | Weaver et al. | |
| 2007/0041426 A1* | 2/2007 | Hashimoto | H04B 1/7163 375/130 |
| 2008/0270579 A1* | 10/2008 | Herz | G06F 17/30867 709/219 |
| 2010/0279706 A1 | 11/2010 | Dicke | |
| 2010/0325235 A1 | 12/2010 | Konno et al. | |
| 2011/0117922 A1 | 5/2011 | Reitsma | |
| 2011/0165890 A1 | 7/2011 | Ho et al. | |
| 2012/0054297 A1 | 3/2012 | Konno et al. | |
| 2012/0108260 A1 | 5/2012 | Alizadeh-Shabdiz | |
| 2014/0066102 A1 | 3/2014 | Kuwahara et al. | |
| 2014/0258388 A1 | 9/2014 | Kuwahara et al. | |

FOREIGN PATENT DOCUMENTS

| | | |
|---|---|---|
| JP | 2007-142613 | 6/2007 |
| JP | 2009-55166 | 3/2009 |
| JP | 2011-309 | 1/2011 |

OTHER PUBLICATIONS

Final Office Action issued in U.S. Appl. No. 13/454,135 dated Mar. 6, 2014 (22 pages).

Kuwahara, U.S. Appl. No. 14/284,676, filed May 22, 2014 (22 pages).

Notice of Allowance issued in parent U.S. Appl. No. 14/284,676 dated May 5, 2015 (10 pages).

* cited by examiner

| USER | TIME | LOCATION INFORMATION |
|---|---|---|
| 0000001 | 2011/11/17 09:45:00 | N35.682241, E139.753411 |
| | 2011/11/17 09:46:00 | N35.684098, E139.744109 |
| | ... | ... |
| 0000002 | 2011/11/17 11:20:03 | N35.680289, E139.753411 |
| | 2011/11/17 11:20:33 | N35.684098, E139.743637 |
| | ... | ... |
| ... | ... | ... |

| SUBJECT DEVICE | | | ANOTHER DEVICE | | | TIME | LOCATION INFORMATION |
|---|---|---|---|---|---|---|---|
| DEVICE ID | IDENTIFICATION OF USER DATA SET | FLAG | DEVICE ID | IDENTIFICATION OF USER DATA SET | FLAG | | |
| 0000001 | .../.../.../ | Not yet | 0000002 | .../.../.../ | Done | 2011/11/17 09:45:00 | N35.682241, E139.753411 |
| ... | ... | ... | ... | ... | ... | ... | ... |

FIG. 12

SERVER ENABLED USER DATA EXCHANGE BETWEEN INFORMATION PROCESSING DEVICES

CROSS REFERENCE TO RELATED APPLICATIONS

This application is a continuation of U.S. application Ser. No. 14/284,676, filed May 22, 2014, which is a continuation of U.S. application Ser. No. 13/454,135, filed on Apr. 24, 2012, and claims priority to Japanese Patent Application No. 2011-269919, filed Dec. 9, 2011, the contents of each of which are incorporated herein by reference.

TECHNICAL FIELD

The present invention relates to exchanging data between two information-processing devices.

RELATED ART

Data exchange between two information-processing devices (for example, two portable game devices) that are proximate spatially, is known.

SUMMARY

In a related art, data exchange is performed when two information-processing devices are located within a radio-wave range of each other.

The present invention provides flexibility in determining a condition for performing data exchange between two information-processing devices.

According to one aspect of the invention, there is provided a server device including: a receiving unit configured to receive, from each of a plurality of information-processing devices, location information showing a respective location of each information-processing device; a setting unit configured to set a condition showing that one information-processing device is close to another information-processing device, based on a predetermined parameter; a determining unit configured to determine whether a first information-processing device and a second information-processing device from among the plurality of information-processing devices satisfy the condition based on the location information received by the receiving unit; and a transmitting unit configured to transmit information determined at the determining unit to the first information-processing device and the second information-processing device, in a case that the determining unit determines that the first information-processing device and the second information-processing device satisfy the condition.

BRIEF DESCRIPTION OF THE DRAWINGS

Exemplary embodiments will now be described with reference to the following drawings, wherein:

FIG. 12 shows an example of data exchange list 412; and

DETAILED DESCRIPTION

1. Configuration

Figure 1:
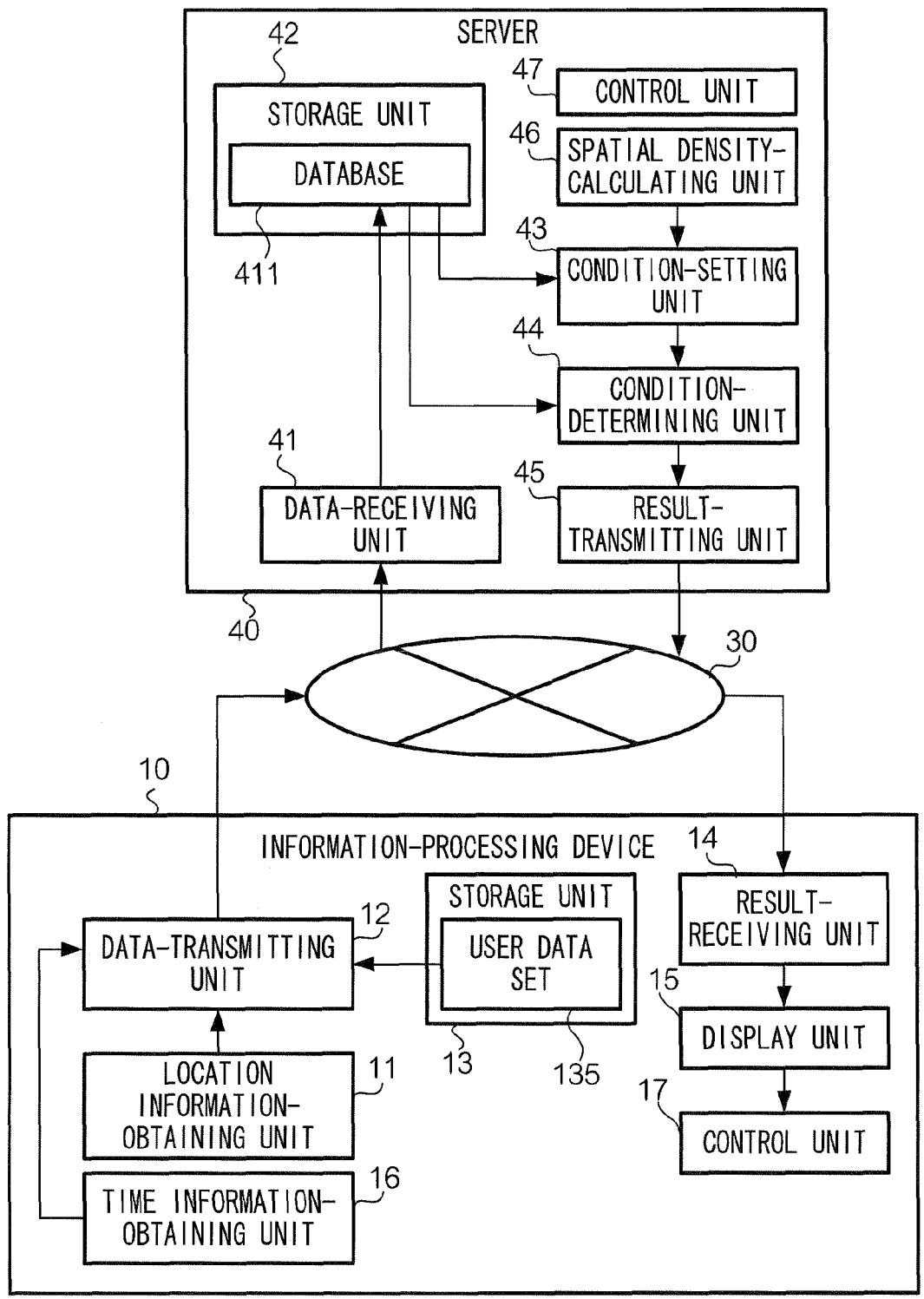
FIG. 1 shows a functional configuration of communication system 1.

FIG. 1 shows a communication system in accordance with an exemplary embodiment of the present invention. In communication system 1, two information-processing devices, which are within the same temporal range and spatial range, exchange data with each other. Communication system 1 includes information-processing device 10, communication network 30, and server 40. Although in FIG. 1 only one information-processing device 10 is shown, communication system 1 may include plural information-processing devices 10. In the following description, to distinguish each of plural information-processing devices 10, subscripts are used, such as information-processing device 10A and information-processing device 10B. Information-processing device 10 is a device for execution of an application program. Communication network 30 is a communication network for relay of data between information-processing device 10 and server 40, and can include a variety of networks such as, for example, the Internet, a mobile communication network, a wireless LAN (Local Area Network). Server 40 is a device for execution of a process for exchanging data between two information-processing devices 10, which devices are within a predetermined temporal and spatial range.

In the related art, when two information-processing devices are within a radio-wave range of each other, whereby near field communication can be performed between them, data is exchanged automatically. In communication system 1 of the present invention, data is exchanged via server 40.

Information-processing device 10 includes location information-obtaining unit 11, data-transmitting unit 12, storage unit 13, result-receiving unit 14, display unit 15, time information-obtaining unit 16, and control unit 17. Storage unit 13 stores various data and programs. In this example, storage unit 13 stores user data set 135. Control unit 17 executes a program, for example, an application program or other programs, and controls another elements of information-processing device 10. Location information-obtaining unit 11 obtains location information showing a location of information-processing device 10, the location information being used for determining whether two information-processing devices 10 satisfy a condition for data exchange (hereinafter, referred to as "data exchange condition"). Time information-obtaining unit 16 obtains time information corresponding to the obtained location information, the time information also being used for determining whether the two information-processing devices 10 satisfy the data exchange condition. Data-transmitting unit 12 transmits to server 40 the location and time information, together with a data set, and at server 40 it is determined whether data exchange condition is satisfied and, if affirmative, the data exchange is performed at server 40. More specifically, data-transmitting unit 12 transmits to server 40, as information to be used to determine whether data exchange condition is satisfied, the location information obtained by location information-obtaining unit 11 and the time information obtained by time information-obtaining unit 16. Further, data-transmitting unit 12 transmits user data set 135 to server 40, which user data set is to be exchanged with user data of another information-processing device 10 by the data exchange. Result-receiving unit 14 receives a result of the data exchange performed at server 40, and the result of the data exchange is displayed to a user via display unit 15 of the user's information-processing device 10.

Server 40 includes data-receiving unit 41, storage unit 42, condition-setting unit 43, condition-determining unit 44, result-transmitting unit 45, spatial density-calculating unit 46, and control unit 47. Data-receiving unit 41 receives from information-processing device 10 location information and user data set 135 for the data exchange. Spatial density-calculating unit 46 calculates, as a parameter for setting the data exchange condition, a spatial density of information-processing devices 10 based on the location information received by the data-receiving unit 41. The spatial density of information-processing devices 10 is calculated for each geographical unit (a predetermined geographic unit is, for example, a prefecture). Condition-setting unit 43 sets (or determines) data exchange condition based on the spatial density of information-processing devices 10 calculated by spatial density-calculating unit 46, which data exchange condition shows that a first information-processing device 10 and a second information-processing device 10 are temporally and spatially close. The data exchange condition indicates restrictions of spatial range and temporal range in relation to first information-processing device 10. More specifically, condition-setting unit 43 sets spatial range and temporal range in response to spatial density at a location shown by the location information received from information-processing device 10A. Condition-determining unit 44 determines whether information-processing device 10A and information-processing device 10B satisfy the data exchange condition, based on location information and time information of information-processing device 10A, and location information and time information of information-processing device 10B. Result-transmitting unit 45 transmits predetermined information to information-processing device 10A and information-processing device 10B if it is determined that information-processing device 10A and information-processing device 10B satisfy the data exchange condition.

Figure 2:
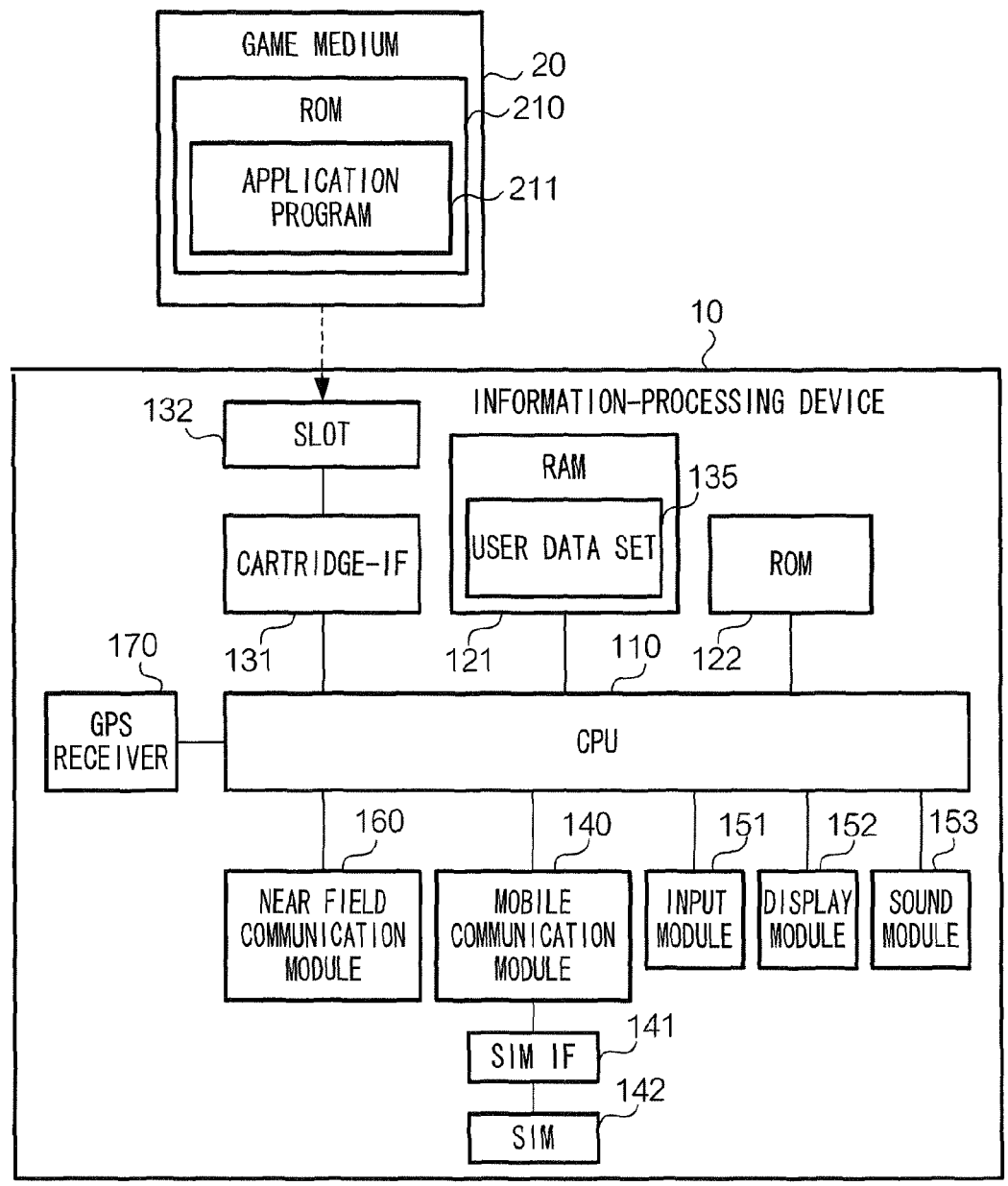
FIG. 2 shows a hardware configuration of information-processing device 10.

FIG. 2 shows a hardware configuration of information-processing device 10. In this example, information-processing device 10 is a portable game device. Information-processing device 10 executes an application program (for example, a game program) stored in program medium 20. Information-processing device 10 is a computer device including CPU (Central Processing Unit) 110, RAM (Random Access Memory) 121, ROM (Read Only Memory) 122, cartridge IF 131, slot 132, mobile communication module 140, SIM (Subscriber Identity Module)-IF 141, and SIM 142, input module 151, display module 152, sound module 153, near field communication module 160, and GPS receiver 170.

CPU 110 is a control device (or a processing device) that controls other hardware components of information-processing device 10. RAM 121 is a read/write storage device. ROM 122 is a read-only storage device. ROM 122 stores, for example, an OS (Operating System) program, which is system software of information-processing device 10 and other application programs (not shown in the figures). In this example, RAM 121 stores user data set 135 of a user of information-processing device 10. User data set 135 includes, for example, an avatar image of a user, a user name, and a message.

Cartridge interface 131 is an interface that relays writing/reading data to/from program medium 20. Slot 132 has a predetermined form and size. Program medium 20 includes a housing (or case) (not shown in the figures) containing ROM 210. The housing has a form and a size corresponding to slot 132. ROM 210 is a rewritable non-volatile memory; for example, a semiconductor memory. In other words, program medium 20 is a ROM cartridge including a semiconductor memory. ROM 210 stores application program 211.

Mobile communication module 140 is a module for communicating via a mobile communication network. Mobile communication module 140 includes, for example, an antenna and an amplifier. SIM IF 141 is an interface that relays writing/reading data to/from SIM 142. SIM 142 includes a storage device that stores an identification number to identify a subscriber in the mobile communication network.

Input module 151 is a module that inputs data to CPU 110, and includes, for example, a keypad, a touch screen, or a microphone. Display module 152 is a module that displays an image in accordance with instructions output from CPU 110. Display module 152 includes, for example, a liquid crystal display and a driver circuit. Sound module 153 is a module that outputs sound in accordance with instructions output from CPU 110, and includes, for example, a speaker and an amplifier.

Near field communication module 160 is a module for performing communication complying with a predetermined standard, for example, a wireless LAN complying with IEEE 802.11. GPS receiver 170 receives signals from plural GPS satellites (not shown in the figures), and calculates global position (for example, latitude and longitude) by using the received signals.

CPU 110 executing the OS program is an example of location information-obtaining unit 11, time-obtaining unit 16, and control unit 17. CPU 110 used in cooperation with mobile communication module 140 or near field communication module 160 is an example of data-transmitting unit 12, and result-receiving unit 14. ROM 122, external memory 124, and RAM 121 are examples of storage unit 13.

Figure 3:
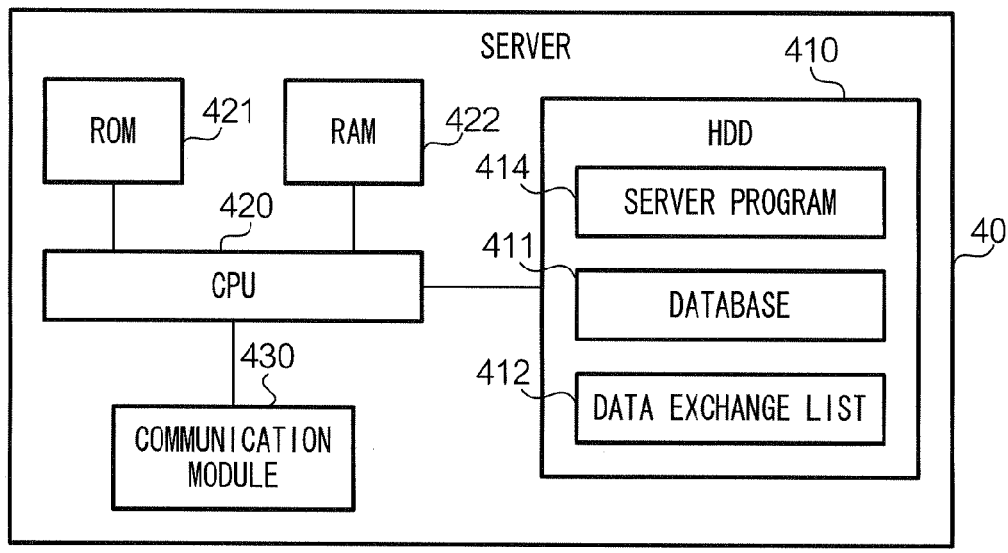
FIG. 3 shows a hardware configuration of server 40.

FIG. 3 shows a hardware configuration of server 40. Server 40 is a computer device including HDD (Hard Disk Drive) 410, CPU 420, ROM 421, RAM 422, and communication module 430. ROM 421 and RAM 422 are a non-volatile and a volatile storage device, respectively. HDD 410 is a nonvolatile storage device. HDD 410 stores server program 414, database 411, and data exchange list 412. Server program 414 is a program for causing a computer device to function as server 40. CPU 420 is a control device that controls other components of server 40. Communication module 430 is a device that communicates via the Internet, and includes, for example, a network interface.

CPU 420 executing server program 414 implements the functions shown in FIG. 1. CPU 420 executing server program 414 is an example of condition-setting unit 43, condition-determining unit 44, spatial density calculating unit 46, and control unit 47. CPU 420 cooperating with communication module 430 is an example of data-receiving unit 41 and result-transmitting unit 45. ROM 421, RAM 422, and HDD 410 are examples of storage unit 42.

2. Operation 2-1. Outline of the Operation

Figure 4:
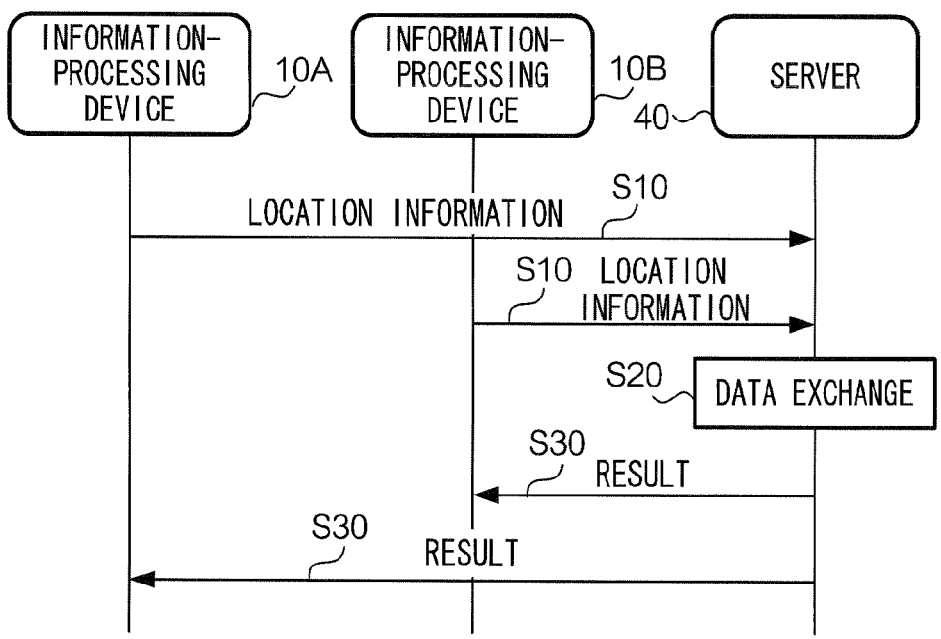
FIG. 4 is a sequence chart outlining an operation of communication system 1.

FIG. 4 is a sequence chart illustrating an outline of an operation of communication system 1. In step S10, information-processing device 10A and information-processing device 10B respectively transmit to server 40 their own location information. In step S20, server 40 performs data exchange process based on the received location information. In step S30, server 40 transmits results of the data exchange process to information-processing device 10A and information-processing device 10B. These processes are implemented as functions achieved by the OS program of information-processing device 10 and server program 414 of server 40.

2-2. Transmission of Location Information and Time Information

Figures 5, 6:
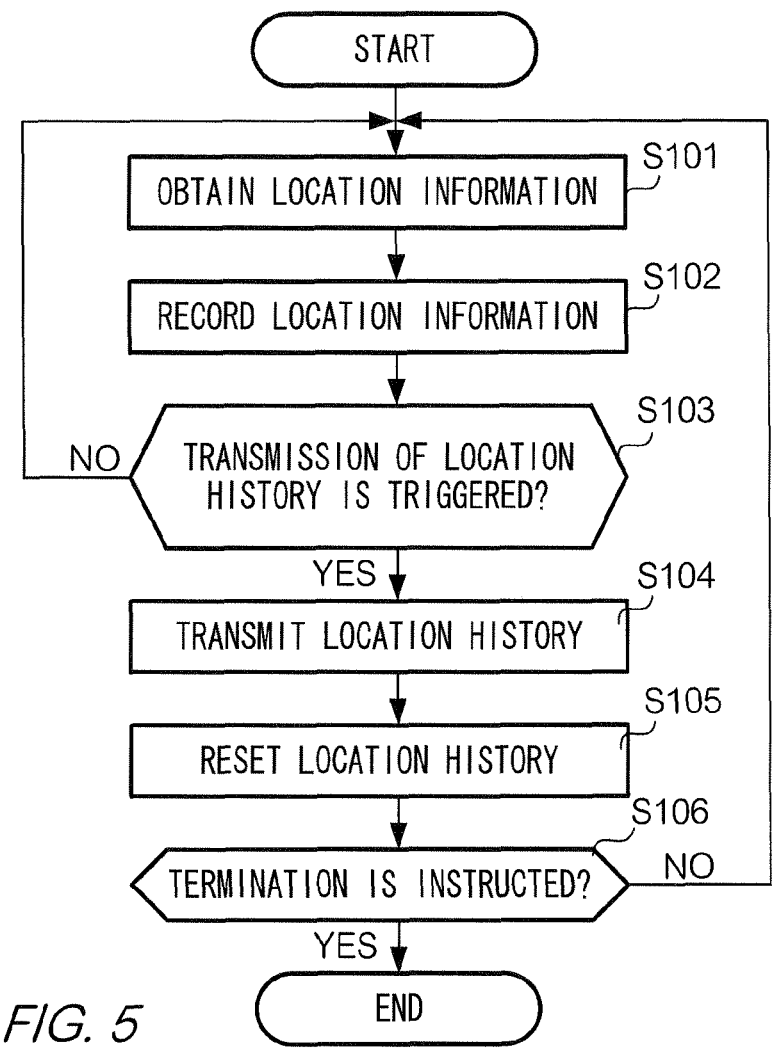
FIG. 5 is a flowchart illustrating an operation for transmitting location information.
FIG. 6 shows an example of the location history.

FIG. 5 is a flowchart illustrating an operation for transmitting the location information. The flow shown in FIG. 5 corresponds to step S10 in FIG. 4. The flow shown in FIG. 5 is triggered by an instruction to initiate the data exchange process. The instruction is input by, for example, a user.

In step S101, CPU 110 obtains location information. In this example, CPU 110 obtains location information from GPS receiver 170. Updated location information is periodically obtained. Further, CPU 110 obtains time information from a time-measuring unit such as a timer (not shown in the figures). In this example, the location information and the time information are transmitted to server 40 as a location history. The location history includes plural sets of location information and time information, obtained at different times. In step S102, CPU 110 records the obtained location information and time information obtained in step S101 into the location history. The location history is stored in RAM 121.

FIG. 6 shows an example of the location history. The location history includes plural sets of data, each set of data including a time stamp and corresponding location information. For example, the first row data set indicates that information-processing device 10 is at north latitude 35.682241 and east longitude 139.753411 on 9:45:00, Nov. 17, 2011.

Referring to FIG. 5 again, in step S103, CPU 110 determines whether transmission of the location history is triggered. If it is determined that the transmission is triggered (S103: YES), CPU 110 transfers the operation to step S104. If it is not determined that the transmission is triggered (S103: NO), CPU 110 transfers the operation to step S101. In this example, information-processing device 10 can communicate with server 40 via two paths. One is a path via mobile communication module 140 (in other words, via the mobile communication network); the other is a path via near field communication module 160 (in other words, via wireless LAN). Which path is used is determined, for example, in accordance with an instruction input by a user. For example, if information-processing device 10 is communicating via mobile communication module 140, an event that a predetermined time period has elapsed from a previous transmission of the location history is used as a trigger for transmission of the location history. As another example, if information-processing device 10 is communicating via near field communication module 160, an event that a connection is established with a wireless LAN access point is used as a trigger for transmission of the location history.

In step S104, CPU 110 transmits to server 40 the location history stored in RAM 121 and identification data of information-processing device 10 (hereinafter referred to as "device ID.") In this example, CPU 110 transmits the location history along with user data set 135.

In step S105, CPU 110 resets the location history stored in RAM 121. In step S106, CPU 110 determines whether termination is instructed. If it is not determined that termination is instructed (S106: NO), CPU 110 transfers the operation to step S101. If it is determined that termination is instructed (S106: YES), CPU 110 terminates the flow shown in FIG. 5.

2-3. Data Exchange Process

Figure 7:
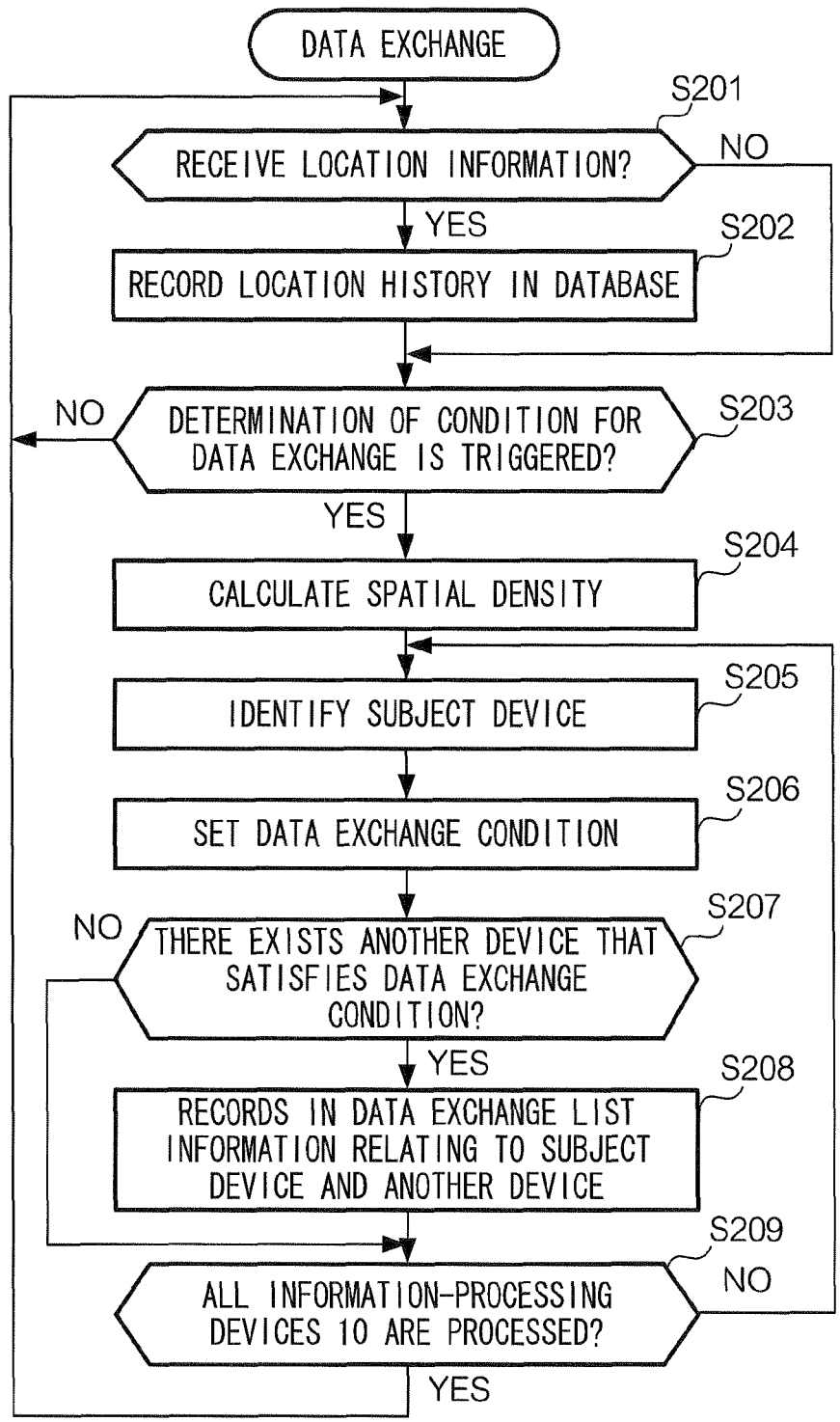
FIG. 7 is a flowchart illustrating a data exchange process at server 40.

FIG. 7 is a flowchart illustrating the data exchange process at server 40. The flow shown in FIG. 7 corresponds to step S20 in FIG. 4.

In step S201, CPU 420 determines whether CPU 420 receives location information from information-processing device 10. If it is determined that the location information is received (S201: YES), CPU 420 transfers the operation to step S202. If it is not determined that the location information is received (S201: NO), CPU 420 transfers the operation to step S203.

In step S202, CPU 420 records the received location history into database 411. Further, CPU 420 stores in HDD 410 user data set 135, which is received along with the location history.

Figures 8, 13:
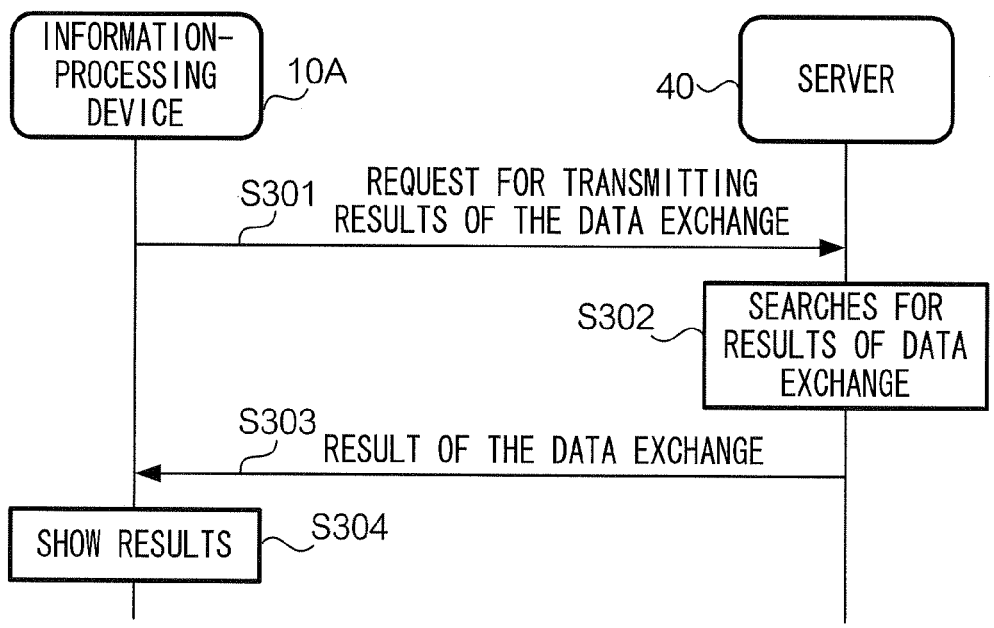
FIG. 8 shows an example of data recorded in database 411.
FIG. 13 is a sequence chart illustrating an operation for transmitting results of the data exchange.

FIG. 8 shows an example of data recorded in database 411. Database 411 includes plural sets of a device ID and corresponding location history of information-processing device 10.

Referring to FIG. 7 again, in step S203, CPU 420 determines whether determination of the condition for the data exchange is triggered. The determination is triggered, for example, by an event, such as a predetermined time period having elapsed since the previous determination. If it is determined that the determination is triggered (S203: YES), CPU 420 transfers the operation to step S204. If it is not determined that the determination is triggered (S203: NO), CPU 420 transfers the operation to step S201.

In step S204, CPU 420 calculates spatial density of information-processing device 10. The spatial density is calculated for each predetermined geographic unit. More specifically, the spatial density is calculated as follows. First, CPU 420 identifies a current location of each of plural information-processing devices 10. A location corresponding to a time stamp, which is the closest to a predetermined time from among the location histories recorded in database 411, is used as the current location. In another example, a location corresponding to the last time stamp from among the location histories recorded in database 411, is used as the current location. Then, CPU 420 counts the number of information-processing devices 10 for each geographic unit, based on the identified current locations. Then, CPU 420 divides, for each geographic unit, the number of information-processing devices 10 by an area of the geographic unit. It is to be noted that the relationship between the location information and the geographic unit, and the area of the geographic unit are pre-recorded in a database (not shown in the figures) stored in HDD 410. In other words, the spatial density of information-processing devices 10 is a function of the geographic unit. CPU 420 stores the calculated spatial density in RAM 422.

In step S205, CPU 420 identifies one information-processing device 10, which is a subject of the determination (hereinafter referred to as a "subject device"), from among plural information-processing devices 10. The subject devices are identified in a predetermined order, for example, in ascending numerical order of the device IDs.

In step S206, CPU 420 sets (determines, or fixes) the data exchange condition for the subject device. In this example, the data exchange condition is that another information-processing device 10 (hereinafter referred to as "another device"), with which the subject device performs the data exchange, is within temporal range Rt and spatial range Rs in relation to the subject device. Temporal range Rt is a parameter defining a temporal range. For example, temporal range Rt defines duration before and after a reference time, which is defined as time when the subject device is located at a certain location. Spatial range Rs is a parameter defining spatial range. For example, spatial range Rs defines a radius of a circle whose center is the location of the subject device. For a detailed example, in a case of Rt=±1 hour and Rs=50 m, if another device is located in a range within 50 m from the location of the subject device during a period of 1 hour prior to and 1 hour subsequent to the reference time, data exchange is performed.

Figure 9A:
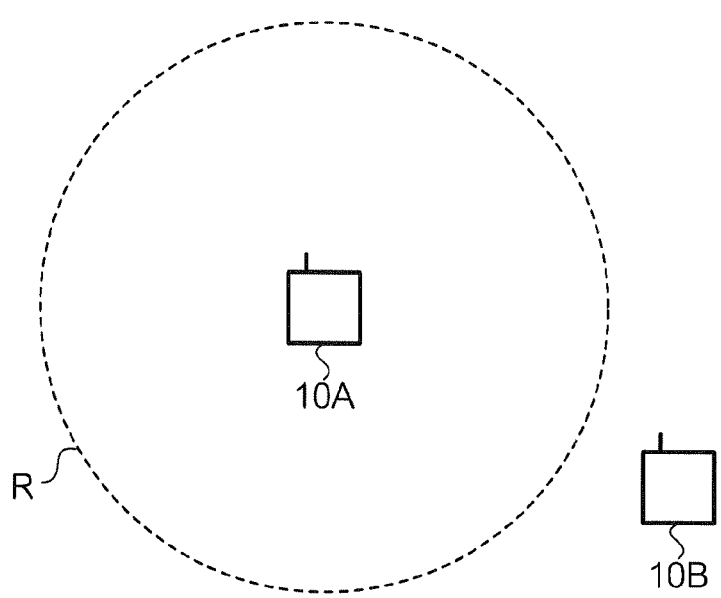
FIGS. 9A and 9B show an example of data exchange condition.
Figure 9B:
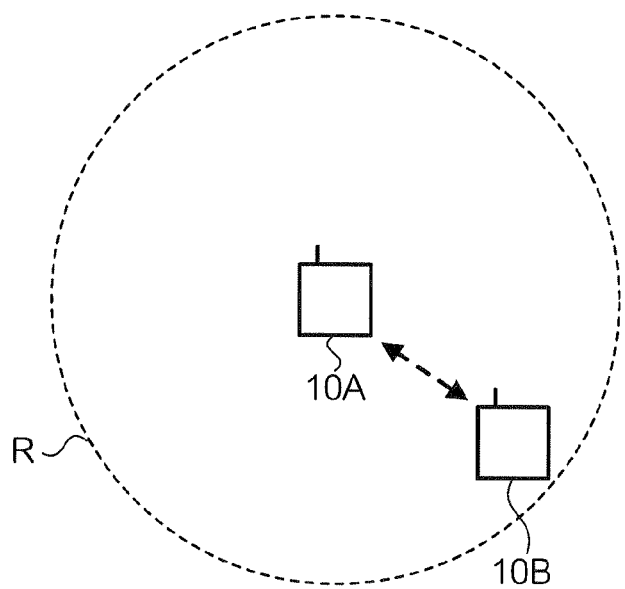

FIGS. 9A and 9B show an example of a data exchange condition. In this example, information-processing device 10A is the subject device and information-processing device 10B is another device. Here, only spatial range Rs is shown, for simplicity of explanation. In this example, spatial range Rs defines an area within a circle whose center is the location of the subject device. In an example of FIG. 9A, since another device is outside the spatial range Rs, the data exchange condition is not satisfied. Therefore, data exchange is not performed. In an example of FIG. 9B, since another device is inside the spatial range Rs, the data exchange condition is satisfied.

Figure 10:
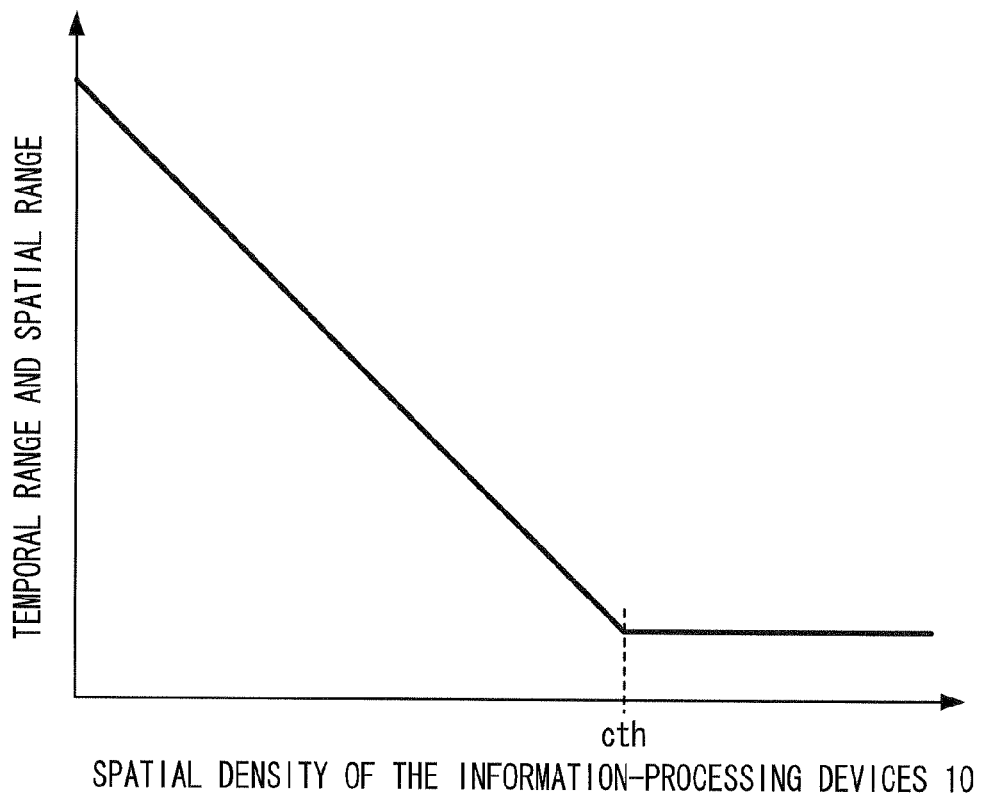
FIG. 10 shows an example of each of a temporal range and a spatial range in relation to spatial densities of information-processing devices 10.
Figure 11:
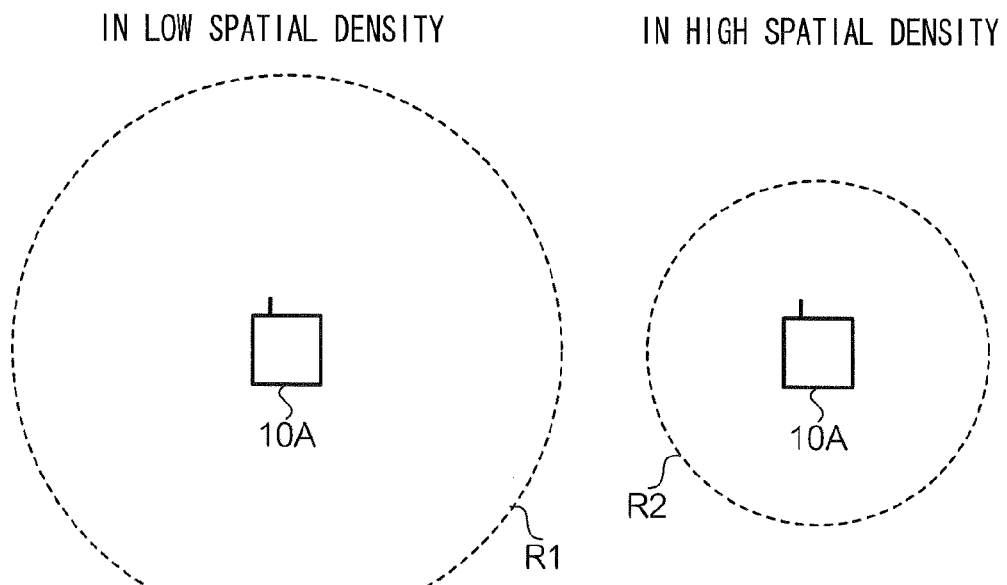
FIG. 11 shows an example of each of a temporal range and spatial range in relation to a spatial density of information-processing devices 10.

FIGS. 10 and 11 show an example of temporal range and spatial range in relation to spatial density of information-processing devices 10. CPU 420 determines values of temporal range Rt and spatial range Rs based on spatial density at the location of the subject device. Spatial range Rs satisfies Rs (c1)≥Rs (c2). Here, Rs (c) shows the spatial range when the spatial density equals c. Temporal range Rt satisfies Rt (c1)≥Rt (c2). Here, Rt (c) shows the spatial range when the spatial density equals c. The spatial densities c1 and c2 are selected freely as long as c1<<c2.

For example, in more detail, spatial range Rs and temporal range Rt decrease together with an increase in the spatial density as long as the spatial density is smaller than threshold cth, and are constant as long as the spatial density is larger than that threshold cth. In other words, at lower spatial density, spatial range Rs and temporal range Rt are broader. At higher spatial density, spatial range Rs and temporal range Rt are narrower. It is to be noted that the profile shown in FIG. 10 is merely an example. For example, temporal range Rt and spatial range Rs may not be linear to the spatial density.

If the data exchange is performed when two devices are located within radio-wave range of each other as described in JP-A-2011-000309, a user who lives in an area whose spatial density is low (for example, a lightly populated area), has less opportunity for the data exchange, compared with a user who lives in an area whose spatial density is high (for example, an urban area). Conversely, communication system 1 provides (especially for users located in an area whose spatial density is low) a higher opportunity for data exchange compared with a case that the data exchange condition is constant and independent from the spatial density of the information-processing device 10.

Referring to FIG. 7 again, in step S207, CPU 420 determines whether there exists another device that satisfies the data exchange condition, based on the location history recorded in database 411. If it is determined that no information-processing device 10 satisfies the data exchange condition (S207: NO), CPU 420 transfers the operation to step S209. If it is determined that there exists another device that satisfies the data exchange condition (S207: YES), CPU 420 transfers the operation to step S208.

In step S208, CPU 420 records in data exchange list 412 information relating to the subject device, and information relating to another device that satisfies the data exchange condition. Data exchange list 412 is stored in HDD 410.

FIG. 12 shows an example of data exchange list 412. Data exchange list 412 includes at least one set (record) of information relating to the subject device and another device, a time stamp indicating when the data exchange condition is satisfied, and location information. The information relating to the device includes a device ID, an identification of a user data set (for example, a filename and a file directory), and a transmission flag. For the time stamp indicating when and the location information indicating where the data exchange condition is satisfied, a time stamp and location information recorded in the location history of the subject device are used. The transmission flag indicates whether a result of the data exchange has been transmitted. In an example of FIG. 12, for information-processing device 10 having a device ID "0000001," a result of the data exchange is not transmitted yet. For information-processing device 10 having a device ID "0000002," a result of the data exchange has already been transmitted.

In this example, once the data exchange is performed between two information-processing devices 10, subsequent data exchange is not performed until a predetermined time period has elapsed. Therefore, even if it is determined that the data exchange condition is satisfied in step S207 for two information-processing devices 10, CPU 420 does not record the two information-processing devices 10 into data exchange list 412 in a case that the two information-processing devices 10 are already recorded in data exchange list 412 and the predetermined time period has not elapsed since the previous data exchange.

Referring to FIG. 7 again, in step S209, CPU 420 determines whether all information-processing devices 10 are processed as the subject device. If it is determined that all information-processing devices 10 are processed as the subject device (S209: YES), CPU 420 resets database 411. After resetting database 411, CPU 420 transfers the operation to step S201. If it is determined that there is an information-processing device 10 that is not processed as the subject device (S209: NO), CPU 420 transfers the operation to step S205. In this case, CPU 420 updates the subject device, and executes the processes in step S206 to S208.

2-4. Transmission of Results of Data Exchange

FIG. 13 is a sequence chart illustrating an operation for transmitting results of the data exchange. In step S301, CPU 110 of information-processing device 10A transmits to server 40 a request for transmitting results of the data exchange (hereinafter referred to as a "results request.") The results request includes the device ID of information-processing device 10A. The transmission of the results request is triggered by a predetermined event. For example, if information-processing device 10 is communicating via mobile communication module 140 (in other words, via the mobile communication network), the transmission of the results request is triggered by an event that a predetermined time period has elapsed since the previous reception of the results. In another example, if information-processing device 10 is communicating via near field communication module 160 (in other words, via wireless LAN), the transmission of the results request is triggered by an event that a connection with a wireless LAN access point has been established.

In step S302, CPU 420 of server 40 searches for the results of the data exchange with information-processing device 10A, from data exchange list 412. More specifically, CPU 420 searches data exchange list 412 for a data set that includes the device ID of information-processing device 10A as the subject device or another device and that has a transmission flag "not yet." In an example shown in FIG. 12, the record of the top row is extracted.

In step S303, CPU 420 transmits a result of the data exchange in response to the extracted record. In this example, a result of the data exchange includes a user data set from another device. For example, if an information-processing device 10 that transmits the results request is recorded as the subject device, the results of the data exchange include a user data set of another device. The user data set is an example of provided data. The provided data include, for example, an avatar image of a user, a username, and a message. If an information-processing device 10 that transmits the results request is recorded as another device, the results of the data exchange include a user data set of the subject device. More specifically, CPU 420 reads the required user data set from HDD 410, and generates a result including the read user data set. CPU 420 transmits the generated result to information-processing device 10A, which is a source of the results request.

On receiving the results of the data exchange, CPU 420 overwrites the corresponding transmission flag with "done" in data exchange list 412. Further, if transmission flags of the subject device and another device both indicate "done," CPU 420 deletes the record from data exchange list 412.

In step S304, CPU 110 of information processing device 10A controls display module 152 to show the received results.

As described above, communication system 1 provides flexibility in the data exchange condition, compared with a case that the temporal range and spatial range are constant.

3. Modification

The present invention is not restricted to the embodiment described above. Various modifications can be applied to the exemplary embodiment. Some modifications will be described below. Two or more modifications from among the following modifications may be combined.

3-1. First Modification

A parameter used to setting the data exchange condition is not restricted to an example (spatial density of information-processing device 10 and the location of the subject device) described in the exemplary embodiment. Condition-setting unit 43 may set the data exchange condition based on the following parameter, instead of or as well as, the spatial density of information-processing device 10 and the location of the subject device. Further, condition-setting unit 43 may combine at least two parameters from among the following parameters, so as to determine the data exchange condition.

3-1-1. Location of Another Device

The location of another device may be used as follows. In step S207, CPU 420 identifies one information-processing device 10 as a candidate of another device (hereinafter referred to as a "candidate device"). Plural information-processing devices 10, of which the location history is recorded, are identified as the candidate device one by one, in a predetermined order. CPU 420 calculates coefficient k by using the spatial density at the candidate location. Coefficient k is, for example, a monotonically decreasing function of the spatial density. The maximum value of coefficient k is greater than 1, and the minimum value of coefficient k is less than 1. CPU 420 determines whether the candidate device satisfies the data exchange condition, by using temporal range Rt and spatial range Rs to which coefficient k is multiplied, as parameters to determine whether the data exchange condition is satisfied. In this example, if the subject device and another device are in an area having lower spatial density, a possibility of the data exchange can be raised compared with a case that the spatial density of another device is not considered.

3-1-2. User Attribute

The user attribute may be used as follows. In this example, the user attribute includes a "friend list," which shows association of plural users. The friend list includes device IDs of information-processing devices 10 owned by other users, who are friends of the user. CPU 420 changes the value of coefficient k in response to the candidate device and the friend list. More specifically, if the candidate device is included in the friend list, CPU 420 increases coefficient k. If the candidate device is not included in the friend list, CPU 420 decreases coefficient k. CPU 420 determines whether the candidate device satisfies the data exchange condition, by using temporal range Rt and spatial range Rs to which coefficient k is multiplied, as parameters to determine whether the data exchange condition is satisfied. In this example, if users of the subject device and another device are friends, a possibility of data exchange can be raised compared with a case that they are not friends. It is to be noted that the user attribute is not restricted to friendships. Another attribute, for example, age, sex, or blood type, may be used. In such a case, the user attribute of the subject device is compared with the user attribute of the candidate device. If it is determined that these user attributes are close or analogous, CPU 420 may increase coefficient k so as to increase the possibility of data exchange.

3-1-3. Device Attribute

The device attribute may be used as follows. The device attribute is an attribute, for example, a model, of information-processing device 10. If the model of the subject device or the candidate device is identical with a specific model, CPU 420 may increase coefficient k so as to increase the possibility of data exchange.

3-1-4. Environmental Factors

The environmental factor may be used as follows. The environmental factor is a factor relating to environment of communication system 1, for example, time or weather. If it is night time or if it rains, CPU 420 may increase coefficient k so as to increase the possibility of data exchange.

3-2. Second Modification

Parameters used by condition-setting unit 43 to set the data exchange condition are not restricted to both temporal range Rt and spatial range Rs. Condition-setting unit 43 may set only one of temporal range Rt and spatial range Rs. For example, temporal range Rt may be constant and spatial range Rs may be determined in response to a parameter.

3-3. Third Modification

In a case that a parameter other than the spatial density; for example, the user attribute, is used to determine the data exchange condition, a timing when server 40 obtains the parameter, is not restricted to a timing simultaneous with the location history. For example, information-processing device 10 may transmit the user attribute to server 40, at a different timing from that of transmitting the location history. In this case, storage unit 42 stores a database recording the user attributes. Server 40 stores the received user attribute in the database. When determining the data exchange condition, condition-setting unit 43 refers to the database.

3-4. Fourth Modification

In the data exchange process, provided data, which are exchanged between the subject device and another device, are not restricted to an example described in the embodiment. For example, the provided data may be a data set used by a game program stored in program medium 20 or a data set generated by the game program.

3-5. Fifth Modification

The spatial density used to set the data exchange condition is not restricted the example described in the embodiment. For example, the spatial density may be calculated by a resource other than server 40. In this case, server 40 obtains the spatial density from the resource. Further, the spatial density is not restricted to the spatial density of information-processing devices 10. For example, a spatial density of the users of information-processing devices 10, or a population density, may be used as the spatial density.

3-6. Sixth Modification

The location information obtained by location information-obtaining unit 11 is not restricted to the location information calculated by GPS receiver 170. For example, an identification of a base station that is communicating with mobile communication module 140, may be used as the location information. Alternatively, an identification of a wireless LAN access point that is communicating with near field communication module 160, may be used as the location information.

3-7. Seventh Modification

The time information used to set the data exchange condition need not be transmitted from information-processing device 10 to server 40. In such a case, instead of information-processing device 10, server 40 includes a time-obtaining unit. For example, information-processing device 10 periodically transmits the location information to server 40. Server 40 adds to the received location information the time information obtained by the time-obtaining unit, and stores a set of the location information and the time information as the location history in database 41.

3-8. Other Modifications

The functional configuration and the hardware configuration of information-processing device 10 are not restricted to examples shown in FIGS. 1 and 2. At least a part of the functional elements shown in FIG. 1 and at least a part of the hardware elements may be omitted.

The information-processing device 10 and the program medium 20 are not restricted to a game device and a game medium. The storage unit 21 may store an application program other than a game program; for example, an application program for editing a document, an educational application program, or a business application program. In another example, the information-processing device 10 may be an information-processing device other than a game device, for example, a personal computer, a mobile phone, a PDA (Personal Digital Assistant), or a tablet device.

A program executed by a processor such as the CPU 101 may be provided in a non-statutory computer readable storage medium; for example, a magnetic medium (for example, magnetic tape, magnetic disk (for example, a hard disk, a flexible disk, etc)), an optical medium (for example, an optical disk such as CD (Compact Disk) or DVD (Digital Versatile Disk)), a magnetic optical medium, a semiconductor memory (for example, a flash memory). Further, the program may be downloaded via a network; for example, the Internet.

What is claimed is:

1. A server comprising:
    a receiver configured to receive, from each of a plurality of information-processing devices, location information of each information-processing device and a user attribute information of each user;
    a processor configured to
        set a condition for determining whether one information-processing device is close to another information-processing device, the condition being dynamically determined in response to a parameter; and
        determine whether a first information-processing device and a second information-processing device from among the plurality of information-processing devices satisfy the condition based on the location information and the user attribute information received by the receiver; and
    a transmitter configured to transmit first data to the first information-processing device and second data to the second information-processing device when the first information-processing device and the second processing device satisfy the condition, wherein:
    the parameter includes a spatial density of information processing devices in a geographic area;
    the condition defines a spatial range and/or temporal range in relation to the first information processing device; and
    the condition is dynamically determined in response to the parameter such that the spatial range and/or temporal range decreases as the spatial density increases.

2. The server according to claim 1, wherein the condition is determined so that the condition changes in response to the parameter.

3. The server according to claim 1, wherein the parameter includes the location information of the one information-processing device.

4. The server according to claim 1, wherein the parameter includes the spatial density of information-processing devices whose location is shown by the location information received by the receiver.

5. The server according to claim 4, wherein the processor further configured to calculate the spatial density based on the location information received by the receiver, the spatial density calculated to be included in the parameter.

6. The server according to claim 1, wherein the parameter includes the location information of the other information-processing devices.

7. The server according to claim 1, wherein the parameter includes environmental information of at least one of the plurality of information-processing devices.

8. The server of claim 1, wherein the condition is dynamically determined in response to the parameter such that the condition and the parameter have a nonlinear relationship.

9. The server of claim 1, wherein:
    the condition is dynamically determined in response to the parameter such that the spatial range and/or temporal range decreases as the spatial density increases when the spatial density is smaller than a threshold, and such that the spatial range and/or temporal range are constant when the spatial density is larger than the threshold.

10. The server of claim 1, wherein:
    the parameter includes the user attribute information.

11. A method comprising:
    receiving, from each of a plurality of information-processing devices, location information of each information-processing device and a user attribute information of each user;
    setting a condition for determining whether one information-processing device is close to another information-processing device, the condition being dynamically determined in response to a parameter;
    determining whether a first information-processing device and a second information-processing device from among the plurality of information-processing devices satisfy the condition based on the location information and the user attribute information received by the receiver; and transmitting first data to the first information-processing device and second data to the second information-processing device when the first information-processing device and the second processing device satisfy the condition, wherein:

the parameter includes a spatial density of information processing devices in a geographic area;

the condition defines a spatial range and/or temporal range in relation to the first information processing device; and the condition is dynamically determined in response to the parameter such that the spatial range and/or temporal range decreases as the spatial density increases.

12. The method of claim 11, wherein the condition is dynamically determined in response to the parameter such that the condition and the parameter have a nonlinear relationship.

13. The method of claim 11, wherein:

the condition is dynamically determined in response to the parameter such that the spatial range and/or temporal range decreases as the spatial density increases when the spatial density is smaller than a threshold, and such that the spatial range and/or temporal range are constant when the spatial density is larger than the threshold.

14. The method of claim 11, wherein:

the parameter includes the user attribute information.

15. A server comprising:

a receiver configured to receive, from each of a plurality of information-processing devices, location information of each information-processing device and a device attribute information of each user;

a processor configured to
set a condition for determining whether one information-processing device is close to another information-processing device, the condition being dynamically determined in response to a parameter; and
determine whether a first information-processing device and a second information-processing device from among the plurality of information-processing devices satisfy the condition based on the location information and the device attribute information received by the receiver; and a transmitter configured to transmit first data to the first information-processing device and second data to the second information-processing device when the first information-processing device and the second processing device satisfy the condition, wherein:

the parameter includes a spatial density of information processing devices in a geographic areas;

the condition defines a spatial range and/or temporal range in relation to the first information processing device; and the condition is dynamically determined in response to the parameter such that the spatial range and/or temporal range decreases as the spatial density increases.

16. A method comprising:

receiving, from each of a plurality of information-processing devices, location information of each information-processing device and a device attribute information of each user;

setting a condition for determining whether one information-processing device is close to another information-processing device, the condition being dynamically determined in response to a parameter;

determining whether a first information-processing device and a second information-processing device from among the plurality of information-processing devices satisfy the condition based on the location information and the device attribute information received by the receiver; and transmitting first data to the first information-processing device and second data to the second information-processing device when the first information-processing device and the second processing device satisfy the condition, wherein:

the parameter includes a spatial density of information processing devices in a geographic area;

the condition defines a spatial range and/or temporal range in relation to the first information processing device; and the condition is dynamically determined in response to the parameter such that the spatial range and/or temporal range decreases as the spatial density increases.

* * * * *